(12) United States Patent
Benko et al.

(10) Patent No.: US 8,810,509 B2
(45) Date of Patent: Aug. 19, 2014

(54) INTERFACING WITH A COMPUTING APPLICATION USING A MULTI-DIGIT SENSOR

(75) Inventors: Hrvoje Benko, Seattle, WA (US); Daniel Wigdor, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 12/767,804

(22) Filed: Apr. 27, 2010

(65) Prior Publication Data

US 2011/0260962 A1 Oct. 27, 2011

(51) Int. Cl.
G09G 5/00 (2006.01)
G06F 3/0488 (2013.01)

(52) U.S. Cl.
CPC .. G06F 3/04883 (2013.01); *G06F 2203/04808* (2013.01)
USPC ............ 345/156; 345/173; 715/700; 715/863

(58) Field of Classification Search
USPC ................... 345/156, 173–178; 715/700, 863
See application file for complete search history.

(56) References Cited

U.S. PATENT DOCUMENTS

| | | | |
|---|---|---|---|
| 5,825,352 A * | 10/1998 | Bisset et al. | 345/173 |
| 6,507,352 B1 | 1/2003 | Cohen et al. | |
| 7,158,123 B2 | 1/2007 | Myers et al. | |
| 7,180,501 B2 | 2/2007 | Marvit et al. | |
| 8,239,784 B2 * | 8/2012 | Hotelling et al. | 715/830 |
| 2004/0021633 A1 * | 2/2004 | Rajkowski | 345/156 |
| 2006/0010400 A1 * | 1/2006 | Dehlin et al. | 715/856 |
| 2007/0247435 A1 | 10/2007 | Benko et al. | |
| 2008/0005703 A1 * | 1/2008 | Radivojevic et al. | 715/863 |
| 2008/0036743 A1 * | 2/2008 | Westerman et al. | 345/173 |
| 2008/0211766 A1 * | 9/2008 | Westerman et al. | 345/156 |
| 2009/0027337 A1 * | 1/2009 | Hildreth | 345/158 |

(Continued)

FOREIGN PATENT DOCUMENTS

| | | |
|---|---|---|
| JP | 09231004 A | 9/1997 |
| JP | 2003173237 A | 6/2003 |
| KR | 100923755 B1 | 10/2009 |
| KR | 1020100033202 A | 3/2010 |

OTHER PUBLICATIONS

"International Search Report", Mailed Date: Nov. 16, 2011, Application No. PCT/US2011/031047, Filed Date: Apr. 4, 2011, pp. 9.

(Continued)

*Primary Examiner* — Christopher E Leiby
(74) *Attorney, Agent, or Firm* — Dan Choi; Carole Boelitz; Micky Minhas

(57) ABSTRACT

A technology is described for interfacing with a computing application using a multi-digit sensor. A method may include obtaining an initial stroke using a single digit of a user on the multi-digit sensor. A direction change point for the initial stroke can be identified. At the direction change point for the initial stroke, a number of additional digits can be presented by the user to the multi-digit sensor. Then a completion stroke can be identified as being made with the number of additional digits. A user interface signal to can be sent to the computing application based on the number of additional digits used in the completion touch stroke. In another configuration of the technology, the touch stroke or gesture may include a single stroke where user interface items can be selected when additional digits are presented at the end of a gesture.

20 Claims, 3 Drawing Sheets

(56) References Cited

U.S. PATENT DOCUMENTS

| | | | |
|---|---|---|---|
| 2009/0193366 | A1 | 7/2009 | Davidson |
| 2009/0198359 | A1* | 8/2009 | Chaudhri .................... 700/94 |
| 2010/0020025 | A1* | 1/2010 | Lemort et al. ............... 345/173 |
| 2010/0050134 | A1* | 2/2010 | Clarkson ..................... 715/863 |
| 2010/0164991 | A1* | 7/2010 | Watanabe et al. ........... 345/635 |
| 2011/0032194 | A1* | 2/2011 | Lai ............................. 345/173 |
| 2011/0234503 | A1* | 9/2011 | Fitzmaurice et al. ........ 345/173 |

OTHER PUBLICATIONS

Celentano, et al., "Gestures, Shapes and Multitouch Interaction", Retrieved at << http://www.dsi.unive.it/~auce/docs/celentano_mimic08.pdf >>, DEXA, Proceedings of the 2008 19th International Conference on Database and Expert Systems Application, Sep. 1-5, 2008, pp. 5.

Kane, et al., "Slide Rule: Making Mobile Touch Screens Accessible to Blind People Using Multi Touch Interaction Techniques", Retrieved at << http://faculty.washington.edu/wobbrock/pubs/assets-08.pdf >>, ACM SIGACCESS Conference on Computers and Accessibility, Proceedings of the 10th international ACM SIGACCESS conference on Computers and accessibility, Oct. 13-15, 2008, pp. 8.

Buxton, Bill., "Multi-Touch Systems that I Have Known and Loved", Retrieved at << http://www.cs.berkeley.edu/~tlavian/spring2009/Projects/Multy%20touch%20systems.pdf >>, Jan. 12, 2007, pp. 10.

Grossman, et al., "Hover Widgets: Using the Tracking State to Extend the Capabilities of Pen-Operated Devices", Retrieved at << http://graphics.stanford.edu/papers/maneesh-preprints/hover.pdf >>, Conference on Human Factors in Computing Systems, Proceedings of the SIGCHI conference on Human Factors in computing systems, Apr. 22-27, 2006, pp. 10.

Bau, et al., "OctoPocus: A Dynamic Guide for Learning Gesture-Based Command Sets", Retrieved at << http://insitu.Iri.fr/~bau/files/uist2008op.pdf >>, Symposium on User Interface Software and Technology, Proceedings of the 21st annual ACM symposium on User interface software and technology, Oct. 19-22, 2008, pp. 10.

Kurtenbach, et al., "The limits of expert performance using hierarchic marking menus", Retrieved at http://wiki.Iri.fr/fondihm/_files/markingmenus-chi93-kurtenbach.pdf >>, Conference on Human Factors in Computing Systems, Proceedings of the INTERACT '93 and CHI '93 conference on Human factors in computing systems, Apr. 24-29, 1993, pp. 7.

* cited by examiner

INTERFACING WITH A COMPUTING APPLICATION USING A MULTI-DIGIT SENSOR

BACKGROUND

Selecting items from a menu of functions is a basic computer interaction task when a user interface is used by an end user. Most current menu designs assume that the user has a single interactive point for input which means the menu can be traversed in a linear fashion. For example, a user may have a mouse cursor or a stylus which allows the user to select menu items one by one. In general, such menus can be activated by clicking on an item or by dragging and/or crossing the interaction point through the menu item. Dragging or crossing the interaction point through the menu item is often used with a stylus for a marking menu or a crossing menu system.

In a system with many menu options, the menus are often nested and this means opening a menu item may open a new sub-menu. The use of nesting menus forces the user to traverse many menu items before arriving at their final choice. This process is comparatively slow and potentially error-prone.

In recent years, computer interface hardware has been produced that can recognize when a user presents the user's digits to a sensor device. For example, certain hardware can recognize when a user touches multiple points on a computer screen, interface pad, or interface surface. These multi-digit recognition systems that can register multiple digits (e.g., multiple touch points) for the user interface can be called multi-digit interface systems. In such multi-digit interface systems, the menu design has not taken advantage of the multiple-points of interaction to enhance the menu interaction. As a result, the menus used in multi-digit interface systems have generally remained the same as in the single digit or single interaction point interface systems.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for interfacing with a computing application using a multi-digit sensor. One method may include obtaining an initial stroke using a single digit of a user on the multi-digit sensor. A direction change point for the initial stroke can be identified. At the direction change point for the initial stroke, a number of additional digits can be presented by the user to the multi-digit sensor. Then a completion stroke can be identified as being made with the number of additional digits. A user interface signal to can be sent to the computing application based on the number of additional digits used in the completion stroke. In another configuration of the technology, the stroke or gesture may include a single stroke where user interface items can be selected when additional digits are presented at the end of a gesture.

DETAILED DESCRIPTION

Figure 1:
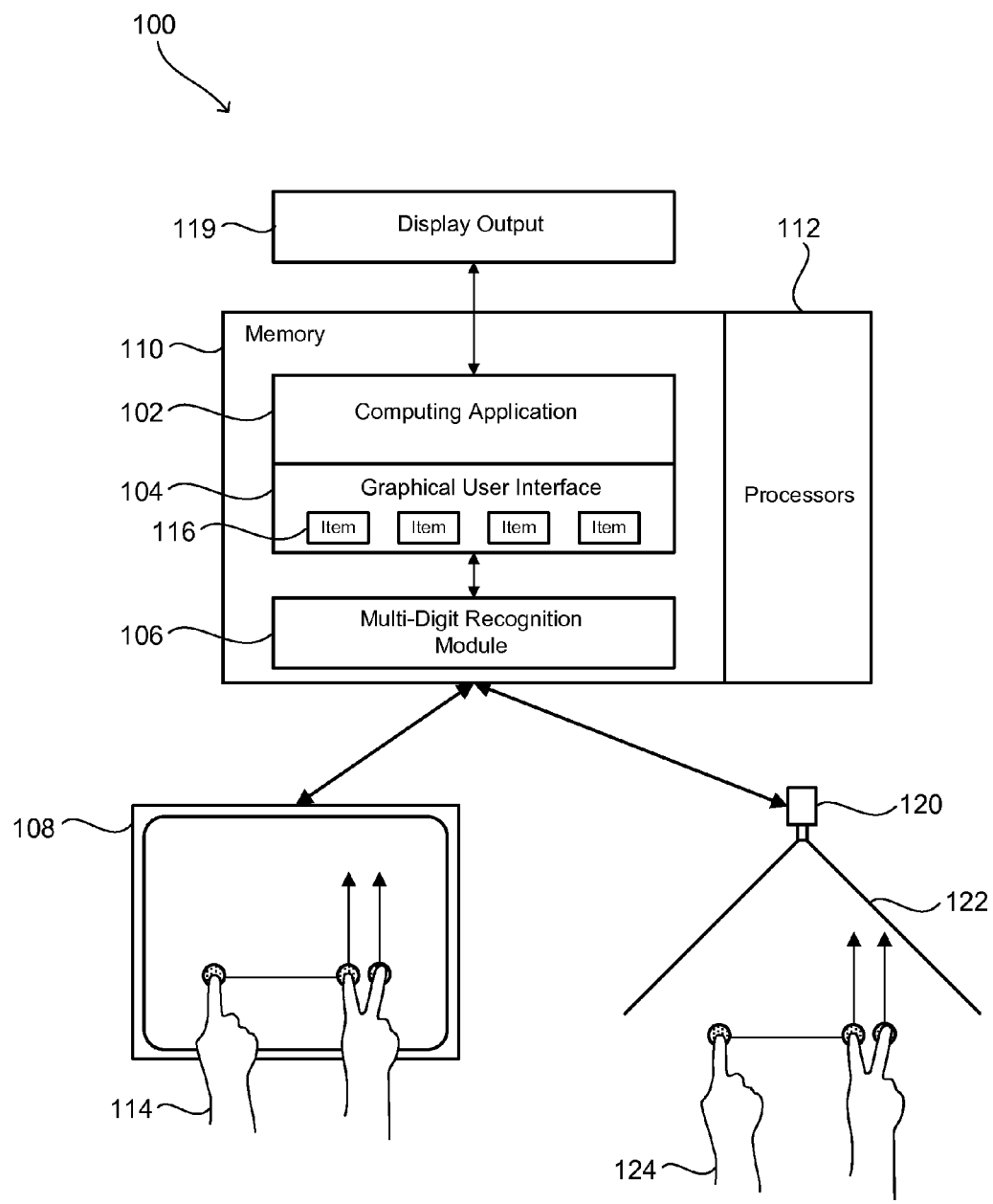
FIG. 1 is a block diagram illustrating a system for interfacing with a computing application using a multi-digit sensor.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

The present technology provides the use of a set of user digit gestures or digit strokes that can reduce the amount of existing menu nesting by enabling a user to more directly select from a larger set of menu options. The gestures can be composed of a finger or hand stroke in combination with a varying number of user digits sensed by a multi-digit sensor. Examples of a multi-digit sensor can include a multi-touch surface device, multi-touch screen, or an optical sensor. The digits used by the user can include the fingers and thumbs. The number of digit contacts together with the shape of the gesture determines which of the several options may be invoked. These gestures are straight-forward to remember, perform, and be detected by the system. In addition, the gestures are also distinct enough not to be frequently randomly invoked or confused with other gestures used for interfacing with a computing device.

FIG. 1 illustrates a system for interfacing with a computing application using a multi-digit sensor 100. The system may include a multi-digit sensor capable of sensing multiple digits (e.g. fingers and thumbs) of a user. In one example configuration, a multi-touch surface device 108 can be configured to detect multiple input touch points from a user 114 when the user touches the user's digits to the sensing surface. The multi-touch surface device may be a multi-touch pad attached as a peripheral or an integrated multi-touch screen device. Many multi-touch devices use capacitive sensing technology, while other multi-touch devices may use optical reflection or other existing touch sensing technologies.

Another example type of a multi-digit sensor may be a motion and/or depth sensor 120 that can be used to sense a user's gestures 124. An example depth sensor may include an infrared projector that projects an infrared beam 122 combined with an optical sensor (e.g. CMOS complementary metal-oxide-semiconductor chip). The sensing range of the depth sensor may be adjustable, so the sensor can automatically depth calibrate in response to the user's physical environment, such as the presence of furniture. Infrared may also allow the multi-digit sensor to sense a user's digits under many types of ambient light conditions. Other types of optical sensors may be used such as a laser sensors, light sensors, or visual cameras.

A computing application 102 can be configured to receive input through a user interface or a graphical user interface 104. The computer software application can be executing on one or more processors 112. For example, the computer software application can be executing on a desktop workstation, server, handheld computing device or another type of computing device. The graphical user interface that is stored in a computer memory 110 may be displayed to an end user via a display output 119 or display screen. In one embodiment, the display output may be an independent output device or the display output may have the multi-touch surface attached directly over the display output. The user interface may also be an audio interface, a touch interface or another interface that is perceptible to a human and where menu sub-items can be chosen.

A multi-digit recognition module 106 can be in communication with the graphical user interface 104. The multi-digit recognition module can be configured to obtain and interpret the electronic signals from the multi-digit sensor device. In one embodiment, the multi-digit recognition module can be a device driver in communication with the graphical user interface and computing application through an operating system.

The input signals received by the multi-digit recognition module can include signals representing a gesture and a number of additional digits presented by the user on the multi-digit sensor device. The term "presented" as used here is defined as a user providing their digits to the digit sensor so that the sensor can recognize a gesture, hand sign, or number of fingers in a gesture. The additional digits may be the additional three fingers and/or thumb on the user's hand. For example, the gesture may be a user moving one finger in a straight or curved line away from an initial point or starting point. In addition, the gesture may be an L-shape or another shape with corners that indicates that the user desires to provide a command to the computing application.

A user interface item 116 in the user interface can be configured to activate a selected user interface function in response to the gesture and the number of digits communicated to the user interface by the multi-digit recognition module. The multi-digit capabilities of the multi-digit sensor device can be combined together with the gesturing menu design and additional digits for selecting user interface items to extend the number of directly accessible menu items with a single hand stroke and without menu nesting.

This technology provides the ability to cull the menu options displayed based on the combination of the direction of the movement of a gesture and the number of digits presented to the multi-digit sensor device. For example, first move one finger to the left, followed by two fingers down to select a particular sub-option of the left menu. In the case of a multi-touch surface this gesture can be performed without lifting the hand from the surface which increases the speed of the selection. Time spent searching through multiple levels of menus can also be reduced because more menu items are available at a time which flattens the overall menu structure.

FIGS. 2A-2E illustrates an example of gestures that can be used with the present technology. In this example, the gesture can select a user interface function and the presentation or placement of the additional digits can enable selection of sub-options or items in the user interface function. The depicted menu selection process can extend a marking menu with the use of multi-digit gestures. The first hand with a single finger extended in each figure shows the starting position for each hand movement. Then the second hand position shows a number of digits or fingers that may be added to the gesture at a direction change point 240 in FIG. 2A. Both hands represent a single user's hand (in this case their right hand).

Figures 2A, 2B, 2C:
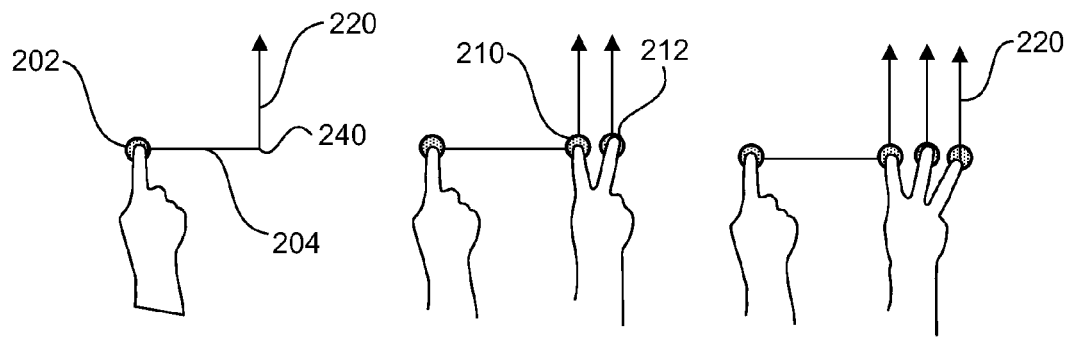
FIGS. 2A-2E illustrate an embodiment of a group of gestures that can be used for interfacing with a computing application using a multi-digit sensor.
Figures 2D, 2E:
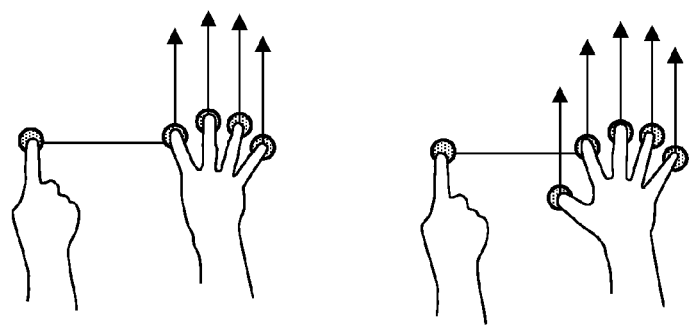

As illustrated in FIG. 2A, the user's finger can be moved away from the initial point 202 and the first straight horizontal line 204 may select the type of function that will be undertaken. As an example, the first line of the gesture that is traced in a direction to the user's right may represent that an editing function is desired.

When the user stops at the end of the line, a direction change may be expected by the interface system. FIG. 2B illustrates that one or more additional menu items 210, 212 or sub-options can be displayed in response to the user's finger tips to help prompt the user regarding which items are available. When a multi-touch surface device is being used, the sub-options can be displayed under the user's finger tips. In the case of an edit function, items such as copy, copy format, cut, paste, or paste special may be the additional items or sub-options. This type of prompting may be provided for users who are new to the interface system, while experts at using this interface may not need graphical prompts. In this example, up to five user digits can be sensed by the multi-digit recognition module. These five different finger configurations, illustrated in FIGS. 2A-2E, can be used to determine which of five user interface items are selected for the gesture. The direction the gesture is made away from an initial point determines which set of five user interface items will be used to make a further selection. Each different direction can have a different item group or set to present to the user. The additional selection can be based on the number of digits sensed by the multi-digit recognition module.

The L-shaped gestures in this example gesture are comparatively uncomplicated to perform, learn, and recognize. These gestures are also easily differentiated from other that gestures may be used to interact with the computing device. The L-shaped gestures have been previously used with a single contact stylus and in the past offered only a single invocation per hand stroke. Whereas, the present technology can offer at least two invocation options per stroke.

As illustrated by FIGS. 2A-2E, the gesture may form a backwards L shape. The initial stroke can be created by the user by moving the single digit away from an initial point. After the initial stroke is completed, a change direction point can be reached. A change direction point is where the direction of a gesture or stroke changes direction at an inflection point or corner. Next, a completion stroke 220 (in FIG. 2C or FIG. 2A) can be performed by the user by moving perpendicular to the initial stroke to form a backwards L. Alternatively, the user may also form a forward L, sideways L facing down, or a sideways L facing up depending on the sub-menu desired to be selected. While the L shape is illustrated here as being orthogonal to a reference side of the sensor device, any rotated orientation of L shape can be used and recognized by the sensor.

While using an L shape is beneficial because it is unlikely to be confused with other interface gestures, the completion stroke can be performed by moving away at another angle to the initial stroke. Instead of moving in a different direction at a 90 degree angle, the completion stroke can move away from the change direction point at some other angle between 0 and 90 degrees. An example of this can be performing the completion stroke at a 45 degree angle to the left or right of the initial stroke.

The L-shaped gestures have been used previously with an interface known as Hover Widgets which were developed by Microsoft. However, the present technology adds the ability to invoke one of a plurality of possible options depending on how many fingers the user has presented to the multi-digit sensor at the direction change point. In the example case, this change direction point is at the corner 240 of the L gesture as in FIG. 2A.

While L-shaped strokes in different directions have been described, the gesture can be other shapes too. For example, defined curved or looping shapes can be used to pick the function and then multiple user digits can be presented to the multi-digit sensor device to select items or sub-options. For example, a partial spiral shape with an inflection on the end may be used. Alternatively, a shape that has multiple change direction points or corners can be used such as a forward or reverse Z shape or a V type shape. Further, the initial stroke may be another distinctive shape that is differentiated from other user interface input strokes.

In some embodiments, the initial stroke can be performed by an East or West stroke with respect to the surface plane of multi-digit sensor device. Then the completion stroke can be performed by moving in a North or South direction with respect to the multi-digit sensor device. Alternatively, the initial stroke can be performed in the North or South direction and the completion stroke can be performed in the East or West direction.

The present technology can use a sequence of one or more hand strokes and a particular number of digits moving in synchrony relative to the multi-digit sensor to invoke a menu option or menu item. When the additional number of digits is presented by the user, the extra digits can move along with part of the hand stroke or gesture from the change direction point to send a user interface signal to the computer application or to complete the selection of the user interface item. As discussed, the technology described can extend the possible space of user interface options that are directly selectable in one user action by a factor of at least five and in some cases 10 or even 20 using directionality. This increase in user selection options at each level can reduce the amount of finger movement on the screen in cases of very large (e.g., deep) menus.

This technology may use a single finger to begin the gesture, but possibly multiple fingers to complete the selection. The expanded selection options allows the system to cull down the number of options displayed on a user interface screen or under a user's fingers on a multi-touch screen, thus reducing visual clutter and providing a simpler and faster way to find and select an item. For example, as soon as the user moves to the user's right (East), the other three options (North, South, and West) can fade away and the sub-options can appear. If performed sufficiently fast in expert use, the user interface visualization of the menu can completely disappear. However, the user can still be sure that a correct menu was selected by knowing how many digits or fingers the user presented to the multi-digit sensor.

While FIGS. 2A-2E illustrate some examples of possible paths for the gestures and presented digits, similar drawings can be generated for all paths that can be traveled in an upward, downward, left and right (North, South, East and West) directions. Additional digits can be presented on such paths to directly select additional sub-options or items. This extends the available menu options at least five times in the case where a single hand is considered or more if an additional hand is used.

Figure 3:
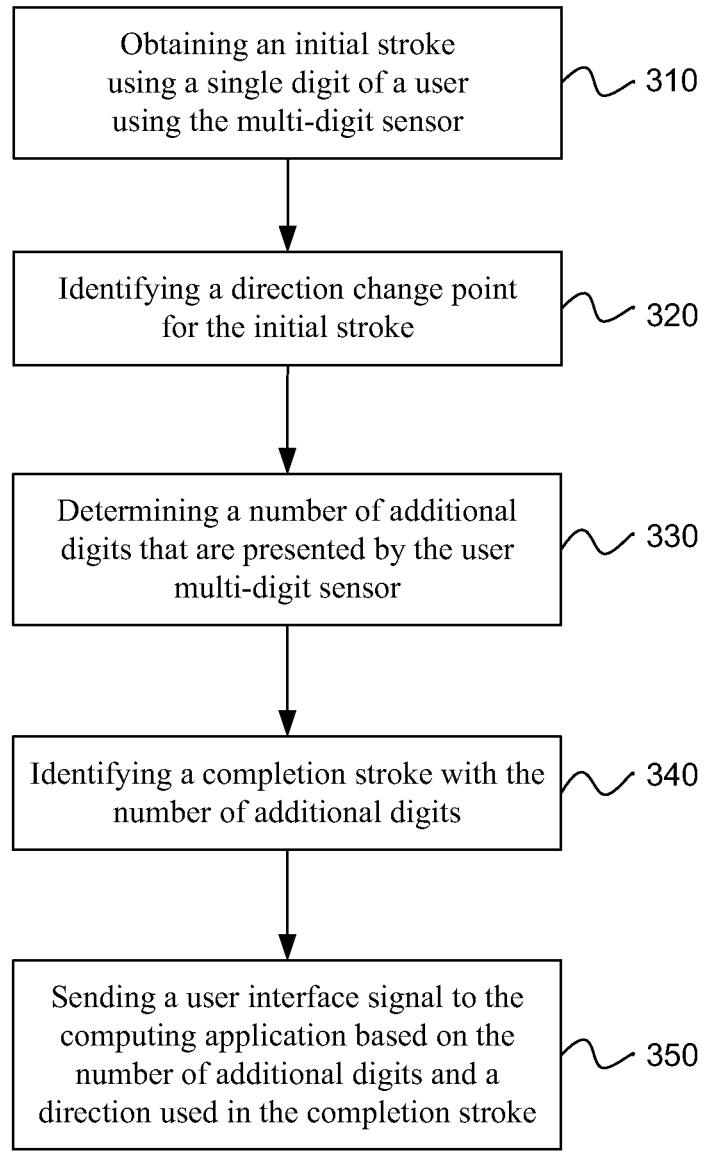
FIG. 3 is a flowchart illustrating an embodiment of a method of interfacing with a computing application using a multi-digit sensor.

FIG. 3 is a flowchart illustrating a method of interfacing with a computing application using a multi-digit sensor device. The method can include the operation of obtaining an initial stroke using a single digit of a user on the multi-digit sensor device, as in block 310. The single digit stroke may be reserved for initiating a command and selecting a starting function point in the user interface menu. A direction change point or intermediate stopping point for the initial stroke can be identified, as in block 320. At this direction change point or inflection point, the system may be configured to expect additional input. For example, a number of additional digits (e.g., fingers and/or thumbs) may be placed by the user on the multi-touch surface device, as in block 330. These additional digits can be presented when the direction change point at the end of the initial stroke with the single digit is reached. The system may identify an additional two digits (or more) that have been presented to the multi-digit sensor device.

A completion stroke with the number of additional digits can also be identified as in block 340. A user interface signal to can be sent to the computing application or a user interface item can be selected in the computing application based on the number of additional digits used in the completion stroke, as in block 350.

In one embodiment, the number of fingers and thumbs can be used to define which menu item is selected. In an alternative configuration, the number of additional menu sub-options displayed at the end of the completion stroke can be reduced based on the number of additional digits used by the user. In the case of reduced menu items at the end of the stroke, an additional selection may be made to determine the final sub-menu or sub-item selection.

In another configuration of the technology, the gesture stroke can be obtained based on a single digit placed on the multi-digit sensor device by a user. When the stopping point for the single gesture stroke on the multi-digit sensor device is identified, then the menu sub-items can be selected when the gesture has stopped. Rather than obtaining a second part of the gesture stroke, the number of additional digits presented by the user to the multi-digit sensor device at the end of the gesture stroke can be determined. As a result, a user interface signal to can be sent to a computing application or a user interface item in the computing application can be selected based on the number of additional digits presented by the user at the stopping point. In contrast to the previous embodiment which has a direction change point, this selection can be made with just one gesture. However, simpler gestures can create more false positives when identifying the gesture. For example, after a single line or curve stroke has stopped, then one or more digits can be placed on the multi-digit sensor device. The additional digits can select an item from the user interface. The single line stroke may also be straight or curved.

Described in other terms, the single gesture of this example selects a defined user interface function and then the placement of the additional digits when the gesture is complete enables selection of sub-items for the user interface function. As discussed before, at least five user digits can be sensed by the multi-digit recognition module and used to determine which of five user interface sub-items is selected for that gesture. The direction of the gesture may be made away from an initial point, and the gesture direction determines which set of five user interface sub-items will be supplied to make a further selection based on the number of digits sensed by the multi-digit sensor device.

In an additional configuration of the technology, both hands can be used to select menu items. When the single gesture is made by either hand, all the remaining nine digits of both hands can be used to select a sub-item when the gesture is completed. Using nine digits can increase the capacity of the menu system by a factor of at least nine and sometimes more using stroke directionality.

In another example interface, cascading of the multi-stroke menus can be provided. A user may first select a sub-menu using the L stroke technique described, and then the user may proceed to select options from that submenu by presenting additional fingers. In a similar manner, two or more L strokes can be chained together to open multiple sub-menus and then the final sub-menu selection can be made when the user presents additional sub fingers to select an item in the last sub-menu that was opened.

To reiterate, the user can begin a menu initiation gesture with a single finger presented to a multi-digit sensor. When the user reaches the corner point or direction change point of the L gesture, the user can present additional digits to specify two to nine or more sub-options or items and directly select a menu item by moving all the placed digits (e.g., fingers and thumbs) in relation to the surface to complete the gesture.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method performed by a computing device comprising a display and an input device, the method comprising:
    monitoring discrete unbroken strokes inputted by a user of the computing device to detect, among the strokes, first unbroken strokes and second unbroken strokes, each discrete unbroken stroke comprising an uninterrupted input inputted by the user providing input from only a single finger;
    the monitoring detecting the first strokes by analyzing features of the strokes to determine that the first strokes have features that correspond to the first strokes: (i) having been inputted by only a single finger, and (ii) having ended with the single finger having moved substantially in only two predefined directions, and (iii) having never been accompanied by input from any other fingers, the two predefined directions comprising a first direction and then a second direction, the first direction different than the second direction;
    each time a first stroke is detected, responding by automatically activating a first function on the computing device;
    the monitoring detecting the second strokes by analyzing features of the strokes to determine that the second strokes have features that correspond to (i) having been inputted by only a single finger, and (ii) having ended with the single finger having moved substantially in only the two directions, and (iii) having been accompanied by input from only one other finger that moved substantially in only the second direction; and
    each time a second stroke is detected, responding by automatically activating a second function on the computing device.

2. A method according to claim 1, further comprising:
    the monitoring detecting third strokes by analyzing features of the strokes to determine that the third strokes (i) were inputted by only a single finger, and (ii) ended with the single finger having moved substantially in only the two directions, and (iii) were accompanied by input from only two other fingers that moved substantially in only the second direction; and
    each time a third stroke is identified, responding by automatically activating a third function on the computing device.

3. A method according to claim 1, wherein the strokes are inputted with a touch-sensitive surface.

4. A method according to claim 1, wherein the strokes are inputted with a video camera.

5. A method according to claim 1, wherein the first function comprises displaying a menu and the second function comprises an item of the menu.

6. A method according to claim 1, wherein the first direction is substantially perpendicular to the second direction.

7. A method according to claim 1, wherein the computing device comprises a display with two pairs of opposing edges, and the first direction corresponds to the first pair of opposing edges and the second direction corresponds to the second pair of opposing edges.

8. A method performed by a computing device comprising a display and an input device, the method comprising:
    receiving strokes inputted by a user using the input device, the input device detecting presentation of fingers for input and detecting movement of fingers presented for input;
    analyzing the strokes inputted by a user with the input device to identify single unbroken strokes substantially having an "L" shape, such single unbroken "L" shaped strokes having a first segment and a substantially perpendicular second segment, wherein for each of the strokes only a single finger inputs the first and second segments, for first of the strokes no other finger accompanies the single finger when inputting the corresponding second segments, and for second of the strokes another finger accompanies the single finger when inputting the corresponding second segments;

for the unbroken "L" shaped strokes, determining whether another finger accompanied the single finger when inputting the second segment; and each time an unbroken "L" shaped stroke ends, automatically selecting, from among a first function and a second function according to whether another finger was determined to accompany the single finger.

9. A method according to claim 8, wherein the first function causes a first set of menu items to be displayed and the second function causes a second set of menu items to be displayed.

10. A method according to claim 8, wherein the first function activates a first user interface feature and the second function activates a second user interface function.

11. A method according to claim 8, further comprising: selecting the first function each time a unbroken "L" shaped stroke ends with a count of zero, selecting the second function each time a unbroken "L" shaped stroke ends with a count of one, and selecting a third function each time a unbroken "L" shaped stroke ends with a count of two.

12. A method according to claim 8, wherein the "L" shaped strokes can have any arbitrary orientation relative to the display.

13. A method according to claim 8, further comprising displaying a menu when an "L" shaped stroke ends and which items are displayed in the menu depends on the count of the "L" shaped stroke.

14. A method performed by a computing device comprising a display and an input device, the method comprising:

analyzing features of discrete unbroken strokes, inputted by a user presenting a single finger to the input device, to identify target strokes substantially having a shape consisting of a first segment inputted by only the single finger before the single finger inputs a second segment, the first segment connected at an angle with the second segment, the first segment having a different direction than the second segment;

each time a target stroke is identified by the analyzing, determining a count of fingers newly presented via the input device substantially at a time when the target stroke's second segment is completed by the user via the input device, wherein the one or more newly presented fingers are associated with the target stroke; and whenever a target stroke ends, performing a first step or a second step according to the corresponding determined count of fingers for the ending target stroke, wherein at least some of the target strokes have a count of a first number, and at least some of the target strokes have a count of second number, and wherein when the count of a target stroke is the first number the first step is performed, and when the count is the second number the second step is performed and the first step is not performed.

15. A method according to claim 14, wherein when the count of the ending target stroke is two a third step is performed.

16. A method according to claim 15, wherein when the count of the ending target stroke is three a fourth step is performed.

17. A method according to claim 15, wherein the angle is substantially ninety degrees.

18. A method according to claim 15, wherein the input device comprises a touch-sensitive surface, and the discrete unbroken strokes are inputted by corresponding discrete periods of a single finger initiating new contact with the touch-sensitive surface and remaining in contact with the touch-sensitive surface until the contact ends.

19. A method according to claim 15, wherein the steps correspond to features of a menu.

20. A method according to claim 19, wherein the features comprise which items of the menu to select or display.

* * * * *